United States Patent [19]
Klaver

[11] 3,983,372
[45] Sept. 28, 1976

[54] APPARATUS AND METHOD FOR A DIGITAL READOUT OF DISTANCE TRAVELED, FUEL CONSUMED AND MILES PER GALLON OF A MOVING MOTOR VEHICLE

[75] Inventor: Rudolf F. Klaver, Albany, Calif.

[73] Assignee: Chevron Research Company, San Francisco, Calif.

[22] Filed: Feb. 3, 1975

[21] Appl. No.: 546,664

[52] U.S. Cl. .................. 235/150.21; 235/151.3; 235/61 J; 73/114
[51] Int. Cl.² .................................... G10M 15/00
[58] Field of Search ....... 235/151.34, 151.3, 150.21, 235/92 MT, 92 FL, 61 J; 73/113, 114

[56] References Cited
UNITED STATES PATENTS

| | | | |
|---|---|---|---|
| 2,282,438 | 5/1942 | Thompson | 235/150.21 X |
| 3,549,868 | 12/1970 | Watson et al. | 235/150.21 X |
| 3,793,882 | 2/1974 | Holben | 235/150.21 X |

*Primary Examiner*—Edward J. Wise
*Attorney, Agent, or Firm*—R. L. Freeland, Jr.; R. T. Kloeppel

[57] ABSTRACT

The apparatus gives a simultaneous readout of the semi-instantaneous rate of fuel consumption, expressed in terms of miles per gallon; the distance traveled; and the total amount of gallons consumed since the apparatus was last reset for a moving vehicle powered by an internal combustion engine. The fuel is metered by a flow transducer which emits a pulse rate representative of fuel flow rate while at the same time the miles traveled by the moving vehicle are measured by a distance transducer also emitting a pulse rate. Both pulse rates are fed to digital integrated circuitry that provides readouts for miles traveled, total fuel consumed and for the semi-instantaneous miles per gallon.

The apparatus also includes a reset switch, a hold switch to maintain the indicator readings while not inhibiting the accumulation of further counts, and internal switches to accommodate vehicle-to-vehicle variations in rear end ratios and tire sizes.

The method comprises the steps of generating a first series of pulses related to fuel flow to the engine so that a predetermined amount of fuel is consumed by the engine prior to emission of a pulse; generating a second series of pulses related to the distance traveled by the vehicle; summing and displaying a sum of all of the second-series pulses accumulated before a pulse emission from the first series. This displayed sum is then replaced by a subsequent sum accumulated up to emission of a respective subsequent pulse from the first series.

Other steps include summing and displaying the entire first and second pulse series to respectively represent total fuel consumed and total miles traveled.

12 Claims, 5 Drawing Figures

APPARATUS AND METHOD FOR A DIGITAL READOUT OF DISTANCE TRAVELED, FUEL CONSUMED AND MILES PER GALLON OF A MOVING MOTOR VEHICLE

BACKGROUND OF THE INVENTION

1. Field of the Invention

The invention relates to an apparatus for giving the digital readout of miles traveled by a moving vehicle, the total amount of fuel consumed during this interval and the semi-instantaneous fuel consumption expressed in miles per gallon.

2. Prior Art

The realization that the seemingly unlimited reserves of hydrocarbon deposits such as crude oil are in fact limited has resulted in a growing concern in conserving hydrocarbon fuels used in vehicles like trucks and automobiles. To do something about this concern requires one to:

... evaluate personal driving habits as they influence the use of fuel

... evaluate the grade of fuel used in the various types of driving situations the vehicle operator encounters ... determine accurately when vehicle tune-ups are required.

To do any or all of the above, necessitates the use of a device to indicate fuel consumption at two different times so that they can be compared.

One way of getting data for such comparisons is to provide a meter for instantaneous readings of miles per gallon (mpg) for a moving vehicle and appropriately recording them for later comparison. But, due to the changing nature of the instantaneous mpg, the needle of such a meter fluctuates widely. Consequently, it is difficult to get a meaningful reading from the meter especially on short trips where the acceleration of a vehicle constantly changes.

However, by the use of this invention a clear and steady reading of the instantaneous miles per gallon is possible. Also with the alternate embodiments disclosed, the total amount of consumed gasoline and the total distance traveled by the moving vehicle can be displayed. These allow calculation of long term average miles per gallon.

From the summary of invention, the description of the drawings, the description of the preferred embodiment and claims, other advantages of the present invention will become evident.

SUMMARY OF INVENTION

The invention is a digital system that gives a semi-instantaneous readout of the rate of gasoline consumption for a moving vehicle. Alternatively, this can be called a miles per gallon (mpg) indicator.

It measures the distance during which a fixed amount of fuel is consumed, for example, the distance traveled for each 0.001 gallon. The fuel flow is measured with a turbinetype flow transducer yielding 100,000 pulses per gallon of flow. The transducer is mounted in the fuel line, preferably in series with a check valve to prevent reverse fuel flow, located between the fuel pump and carburetor. The prevention of reverse flow eliminates false counts which result because the transducer cannot sense the direction of the flow through it.

The miles traveled by the vehicle is determined by digitally detecting and counting either the revolutions of a drive shaft or speedometer cable, for example with a light emitting diode and silicon photo transistor. This may be accomplished by counting infrared light pulses reflected from reflective material or tape located around the periphery of the shaft.

Subsequently, these pulse rates are fed to digital integrated circuitry to provide readouts for miles traveled, total fuel consumed and for semi-instantaneous miles per gallon.

The invention also includes a reset switch, a hold switch to hold the indicator readings while further counts are accumulated, and internal switches to accommodate car to car variations of rear-end ratios and tire sizes.

DESCRIPTION OF THE PREFERRED EMBODIMENT

Figure 1:
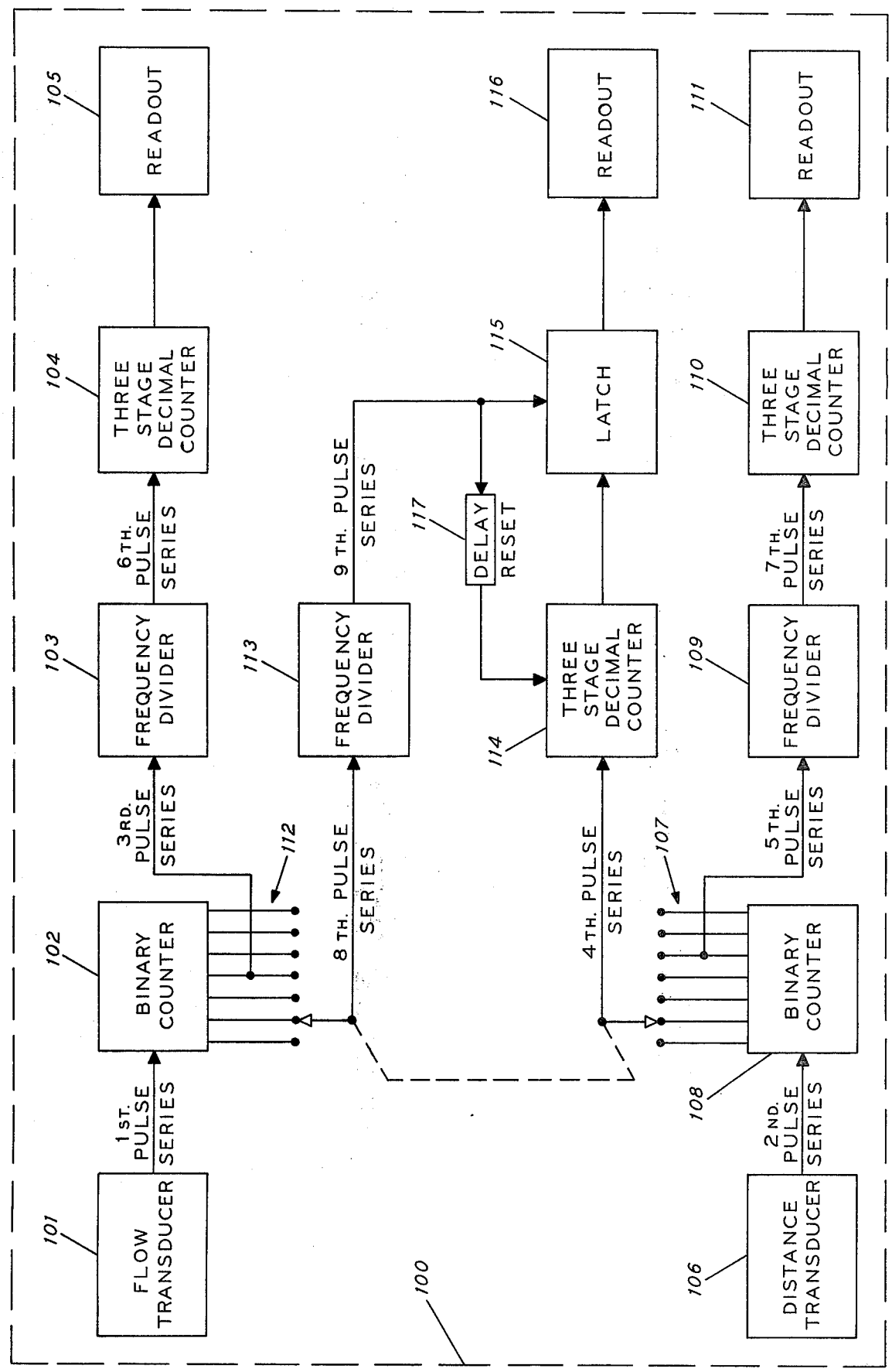
FIG. 1 is a schematic block diagram illustrating the instantaneous mpg indicator with two additional digital displays to indicating the miles traveled in a given interval and total amount of fuel consumed during this interval.
Figure 5:
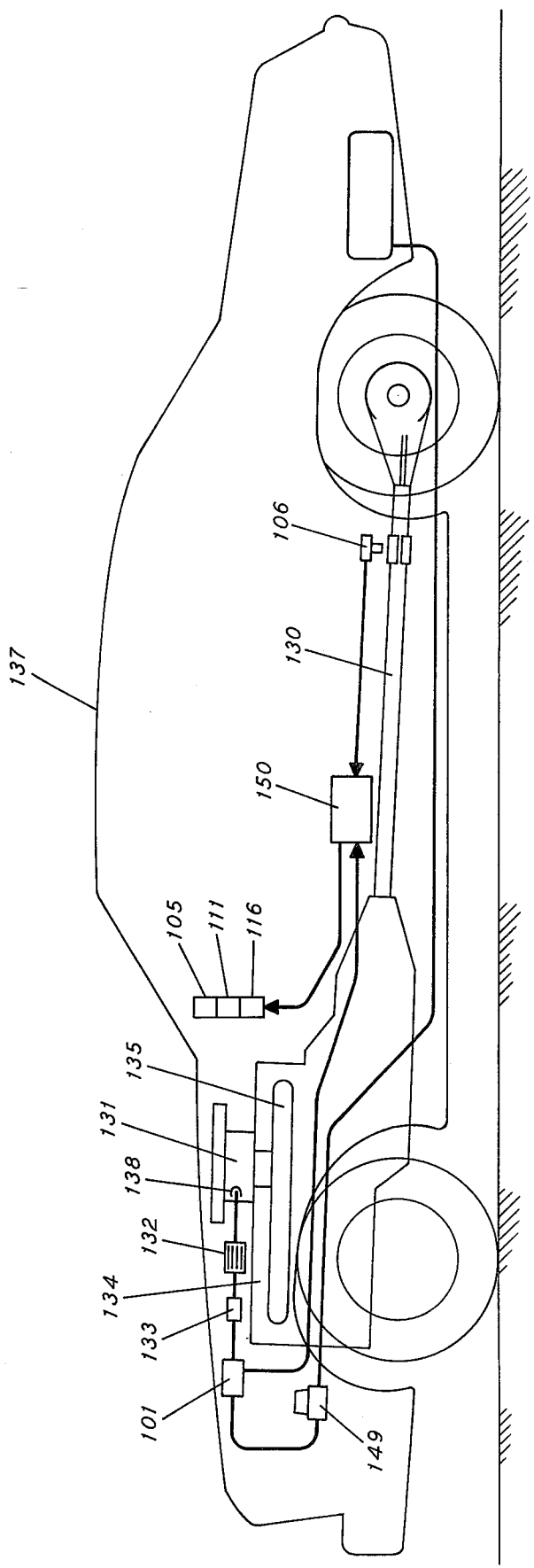
FIG. 5 is a schematic illustration and block diagram showing the invention adapted to an automobile.

The typical system of the semi-instantaneous miles per gallon indicator 100 is shown in the block diagram of FIG. 1. FIG. 5 shows the indicator operatively connected to a vehicle, such as a car 137. The system can be powered by the vehicle's battery. The flow transducer 101, located in line with a carburetor provides an electrical pulse for a given quantity of fuel passing through it, for example, one pulse for each 0.001 gallon.

In the present embodiment, the flow transducer 101 has a rotor installed in the flow path. Its movement is sensed by the interruption of an infrared light beam that passes between a light emitting diode (LED) and a photo transistor; the pulse signal is preamplified inside the flow transducer 101. The flow transducer is adjusted to produce or generate 100,000 pulses for every gallon of flow. Therefore, it produces or generates a first series of pulses (pulse rate) related to unit quantities of fuel flowing to an internal combustion engine.

This primary or first series of pulses is divided as it passes through binary counter 102 to form what is called here a third series. This series is then divided by frequency divider 103 to a series referred to as a sixth series of one hundred pulses per gallon. A sum representing the total volumetric units of fuel consumed in increments of 0.01 gallon is summed for a given interval in a three-stage decimal counter 104 and displayed on readout 105. By changing the division ratio in this sequence, increments larger or smaller than 0.01 gallon could be displayed.

Figure 2:
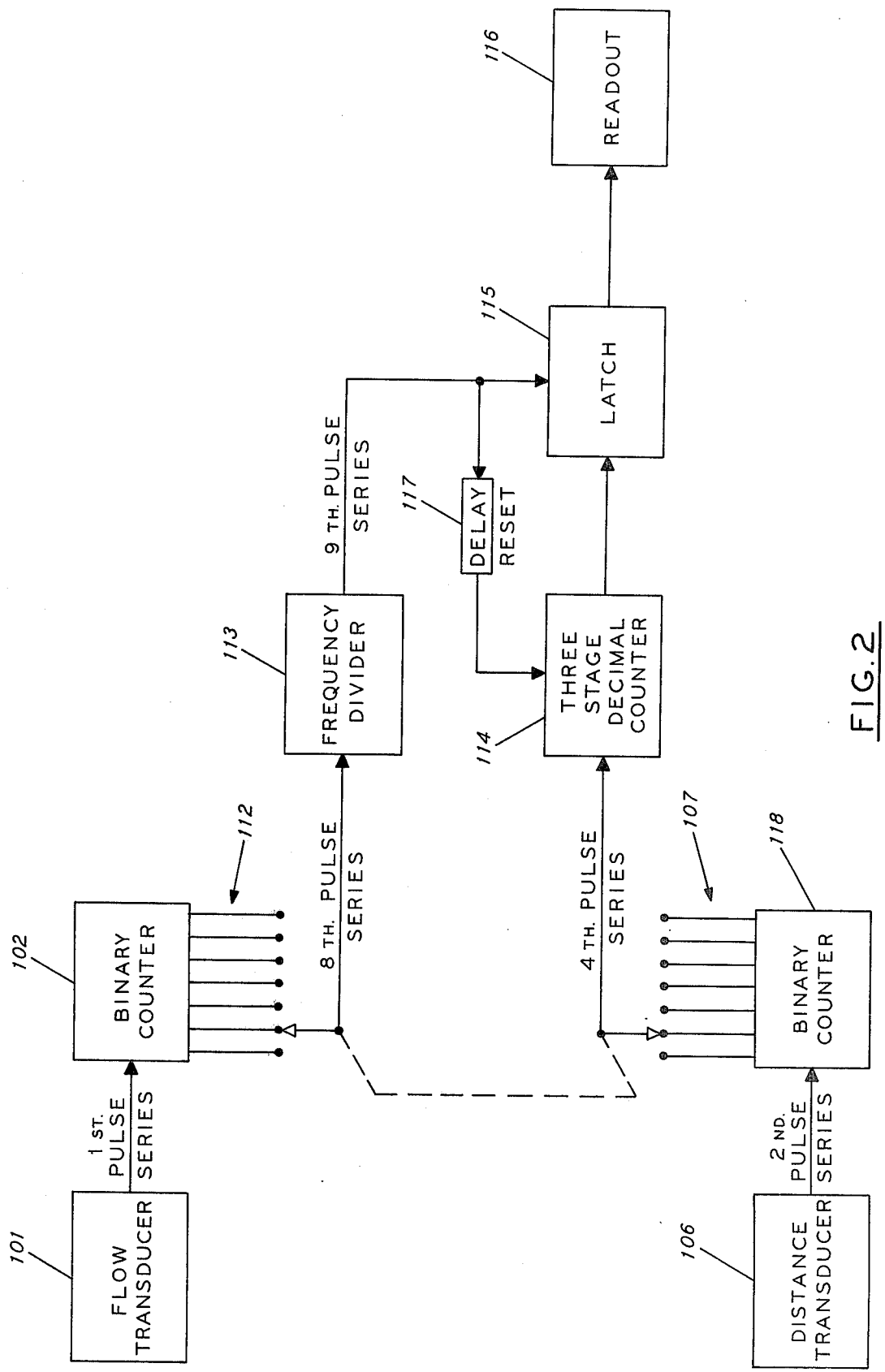
FIG. 2 is a schematic block diagram of semi-instantaneous mpg indicator adaptable to installation on a vehicle.
Figure 4:
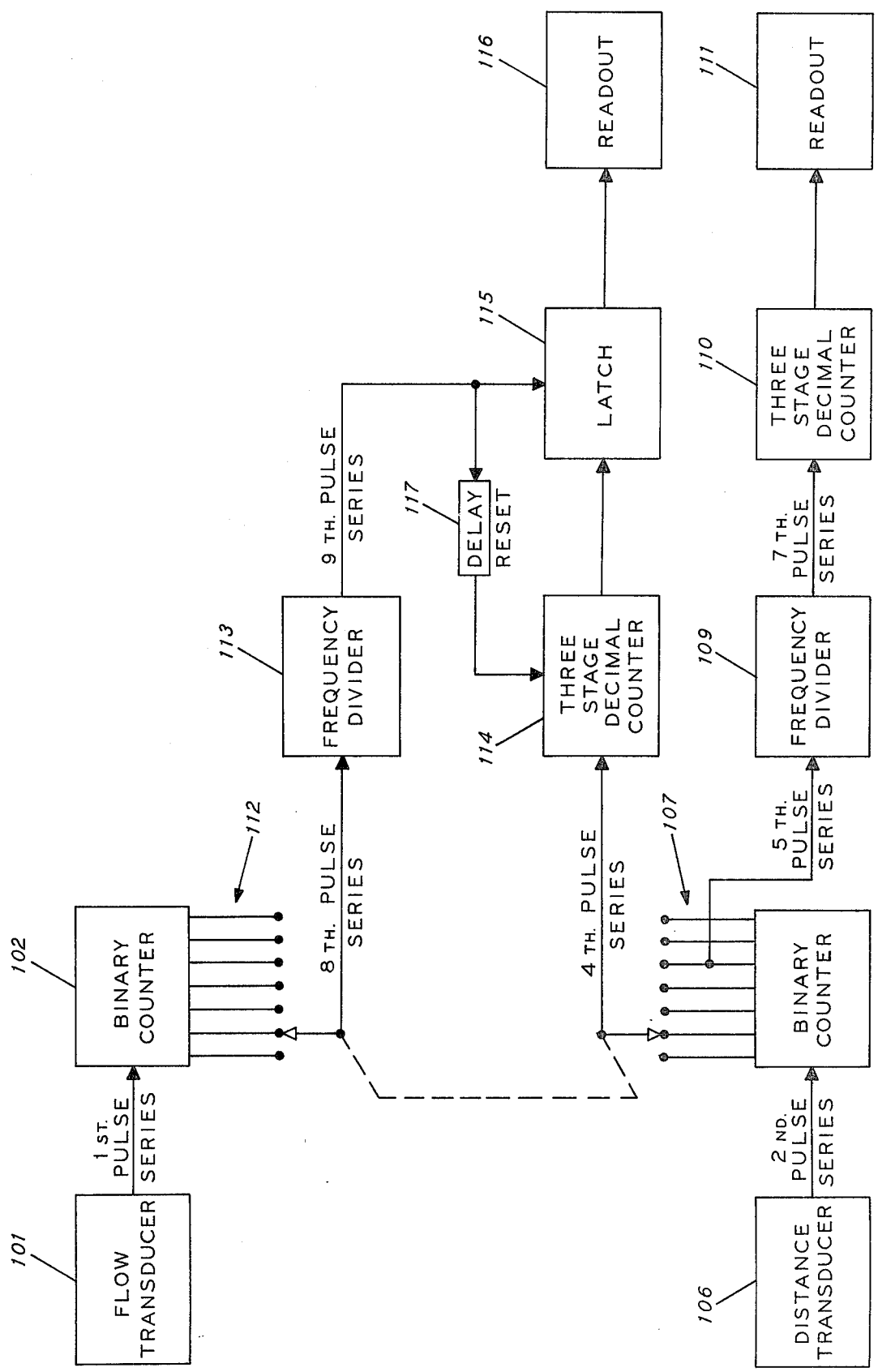
FIG. 4 is a block diagram that shows the mpg indicator and miles-traveled indicator.

A hold switch can be connected to readout 105 to maintain a reading while the counter 104 continues to accumulate counts. A reset switch is also provided to clear the counter 104. Obviously, this chain of division is not done if only mpg (FIG. 2) or both mpg and distance traveled (FIG. 4) are displayed.

A distance transducer 106 operatively connected to either the speedometer cable or the drive shaft 130 also produces or generates a series of pulses (pulse rate) related to the distance traveled by a vehicle. If, for example, four equally spaced tabs of light reflective tape are mounted on the draft shaft 130, FIG. 5, the distance transducer will generate four pulses for each revolution of the drive shaft. The relationship between miles traveled and the revolution of the drive shaft, of course, depends upon the rear axle ratio and the tire size. My observation is that the series of these pulses, called a second series, are between 8,000–10,000 pulses per mile.

Figure 3:
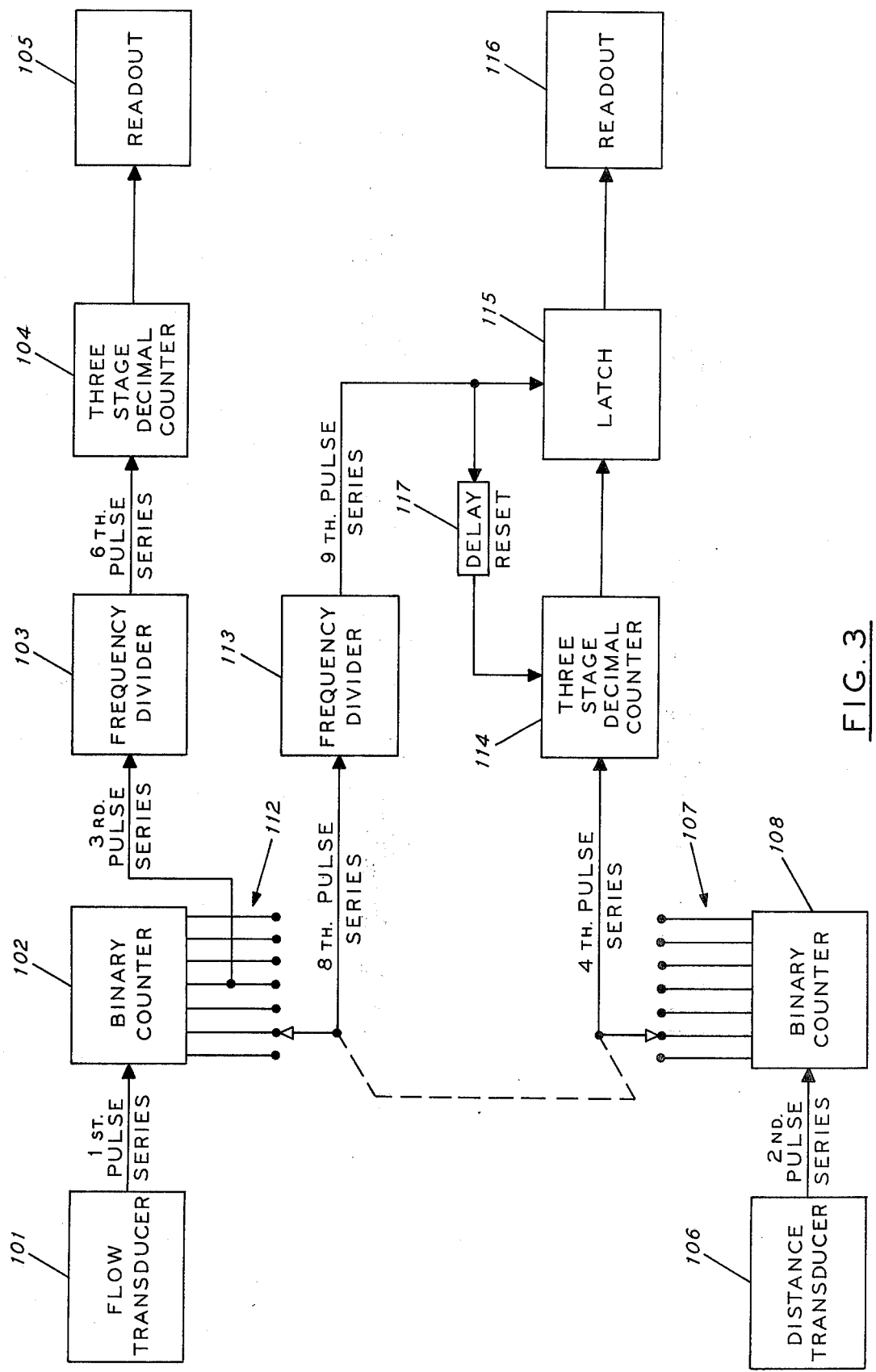
FIG. 3 is a block diagram illustrating the mpg indicator and fuel-consumed indicator.

Subsequently, this series is divided down to ten pulses per mile. The ten pulses are arrived at by division accomplished by the binary counter 108 and the frequency divider 109. The division ratio of frequency divider 109 is adjustable by means of internal switches to accommodate variations in axle ratio and tire size. In the claims, these divisions are referred to respectively as the fifth and seventh series. The pulses of the seventh series are registered in a three stage counter 110 with a readout 111 displaying in increments of 0.1 mile a value equivalent to total miles traveled for given interval. A hold switch can also be included to hold one value while other ones are accumulated. A reset switch is provided to clear the counter. If only mpg and gallons of fuel consumed, (FIG. 3) or mpg by itself (FIG. 2) will be displayed, then the above chain of division is not done.

Simultaneously, the pulse rate from the flow transducer 101 is divided down in another chain. The first division in this chain is by means of binary counter 102 and the setting N of switch 112 (N being either 1, 2, 4, 8, etc.) to form an eighth pulse rate or series. A second division (performed on the eighth pulse rate) is by frequency divider 113 with a division ratio which is presettable to accommodate variations in axle ratio and tire size. The result is a ninth pulse rate in which each pulse represents a quantity of fuel consumed equal to approximately (0.001) (N) gallons.

The pulse rate from the distance transducer 106 is also divided down by means of binary counter 108 and the switch 107. This yields a fourth pulse rate equivalent to the second pulse rate divided by N. This rate is accumulated in decimal counter 114. When a pulse from the ninth pulse train occurs, the contents of decimal counter 114 are transferred to the latch 115 and displayed on readout 116.

After a brief interval measured in microseconds provided by a delay 117 the decimal counter 114 is reset to zero and pulses from the fourth pulse train again are accumulated in decimal counter 114. The delay insures that the contents of the decimal counter 114 are transferred to the latch 115 before decimal counter 114 is reset. The reading displayed on readout 116 is the actual miles per gallon, in increments of 0.1 miles per gallon.

It is noted here that switches 107 and 112 are mechanically coupled so adjustment of one makes a corresponding adjustment of the other. This keeps the relationship between the fourth and ninth pulse series the same. Consequently, the correct readout of mpg regardless of setting of switches 107 and 112 is maintained.

OTHER ASPECTS OF THE PREFERRED EMBODIMENT

In order to more clearly point out other aspects of the preferred embodiment, reference is made to FIG. 5. In this figure, numeral 150 schematically represents the counters, switches, frequency dividers and readouts, described above, that are necessary to provide the values for the readouts 105, 111 and 116.

Among the other aspects of the preferred embodiment is to protect at least the distance transducer 106 by enclosing or locating it to avoid weather or structural damage. Further, location of the flow transducer 101 is important. The best location is one adjacent to the carburetor inlet 138, FIG. 5. But the invention also operates successfully when located between the fuel pump 149 and a fuel filter 132 located in line with the carburetor inlet. A check valve 133 can also be located adjacent to the carburetor or fuel injector inlet side of the flow transducer 101 to prevent reverse flows.

One other important aspect with respect to the fuel transducer is that heat may adversely affect it. For this reason the flow transducer 101 should be located away from the engine block 134 and exhaust manifold 135. In most cars this is accomplished by locating it near the gas filter 132. The transducer could, on the other hand, be heat insulated.

The present invention may be embodied in other specific forms without departing from the essential characteristics of the invention. The embodiment disclosed is therefore considered as being illustrative and not restrictive. The scope of the invention is intended to be limited only by the appended claims rather than this description: all changes which come within the meaning and range of equivalency of the claims are therefore intended to be included.

What is claimed is:

1. An apparatus for indicating distance traveled per unit of fuel used by a vehicle having an internal combustion engine, comprising:
    first means for generating a series of electrical pulses related to a given unit quantity of fuel flowing to said engine;
    second means for generating a series of electrical pulses related to a given unit of distance traveled by said vehicle;
    means for summing the series of pulses from said second means to form a distance-traveled sum;
    singular means for displaying said distance-traveled sum accumulated up to emission of a pulse from said first means so that said distance-traveled sum is equivalent to distance traveled per unit of fuel flowing to said engine;
    means for replacing a first distance-traveled sum with a subsequent distance-traveled sum on said means for displaying when each subsequent pulse from said first means is received by said means for summing so that semi-instantaneous distance traveled per unit of fuel flowing to said engine is displayed.

2. The apparatus for indicating distance traveled per unit of fuel used of Claim 1 including:
    means for summing the series of pulses related to the flow of fuel flowing to said engine to form a fuel-consumed sum for a given interval; and
    means for displaying said fuel-consumed sum.

3. Apparatus for indicating distance traveled per unit of fuel used of Claim 1 including:

means for summing the series of pulses related to the distance traveled by said vehicle to form a distance-traveled sum for a given interval; and means for displaying said distance-traveled sum.

4. Apparatus for indicating distance traveled per unit of fuel used of Claim 3 including:

means for summing the series of pulses related to the flow of fuel flowing to said engine to form a fuel consumed sum for a given interval; and means for displaying said fuel consumed sum.

5. An apparatus for indicating miles per unit of fuel used by a vehicle wherein said vehicle has a tank interconnected through a fuel line with a means for supplying an internal combustion engine of said vehicle with a vaporized mixture of fuel and air, said apparatus comprising:

a flow transducer adapted to sense the flow of liquid fuel by producing an electrical pulse rate related to a unit quantity of fuel flowing past said flow transducer to said internal combustion engine, said flow transducer mechanically connected to said fuel line interconnecting said fuel tank and said means for supplying a mixture of vaporized fuel and air to said engine;

a distance transducer adapted to sense the distance said vehicle travels by producing an electrical pulse rate related to said distance traveled;

means for summing the pulse rate from said distance transducer to form a distance-traveled sum;

means for displaying said sum accumulated up to the emission of one pulse from said flow transducer so that said sum is equivalent to semi-instantaneous distance traveled per unit of fuel; and means for replacing a first distance-traveled sum with a subsequent distance-traveled sum on said means for displaying when each subsequent pulse from said flow transducer is received by said means for summing so that a semi-instantaneous distance traveled per unit quantity of fuel flowing to said internal combustion engine is displayed.

6. The apparatus for indicating miles per gallon of fuel consumed by moving vehicle of Claim 5 further comprising:

a first binary counter electrically connected to said flow transducer, said counter receiving said pulse rate from said flow transducer, respectively dividing said pulse rate to form a third pulse rate and an eighth pulse rate;

a first frequency divider to receive said eighth pulse rate wherein said eighth pulse rate is divided to form a ninth pulse rate; and wherein said means for replacing a first distance traveled sum with a subsequent distance traveled sum further comprises a latch electrically connected to said first frequency divider which is acted upon by a pulse of said ninth pulse rate from said first frequency divider; and a delay electrically connected to said first frequency divider and wherein said means for summing said total number of pulses related to the distance traveled by said vehicle further comprises a second binary counter, said second binary counter receiving the pulse rate from said distance transducer and respectively dividing said pulse rate to form a fourth pulse rate and a fifth pulse rate;

a first decimal counter to sum all pulses of said fourth pulse rate, said first counter electrically connected to said latch and wherein said means for displaying is a first readout electrically connected to said latch, so that all of said summed pulses of said fourth pulse rate are displayed on said first readout when said latch receives a pulse of said ninth frequency from said first frequency divider; and said delay in series with said first frequency divider and said first decimal counter to clear said first decimal counter after a pulse of said ninth pulse rate from said first frequency divider passes through said delay.

7. The apparatus for indicating miles per gallon of fuel consumed by a moving vehicle of claim 6 further comprising a second frequency divider which divides said third pulse rate from said first binary counter to form a sixth pulse rate;

a second decimal counter electrically connected to said second frequency divider wherein a series of pulses from said sixth pulse rate are summed for a given interval; and a second readout electrically connected to said second decimal counter wherein a sum of pulses from said sixth pulse rate is displayed.

8. The apparatus for indicating miles per gallon of fuel consumed by a moving vehicle of Claim 7 further comprising a third frequency divider electrically connected to said second binary counter so as to receive said fifth pulse rate;

said third frequency divider dividing said fifth pulse rate from said second binary counter to form a seventh pulse rate;

a third decimal counter electrically connected to said third frequency divider wherein a series of pulses of said seventh pulse rate are summed for a given interval; and a third readout electrically connected to said third decimal counter wherein a sum of said pulse of said seventh pulse rate is displayed.

9. A method for displaying the rate of fuel consumption of a vehicle that is powered by an internal combustion engine comprising the steps of:

generating a first series of electrical pulses related to fluid flow to said engine so that a predetermined amount of fuel is consumed before the emission of a pulse;

generating a second series of electrical pulses related to distance traveled by said vehicle;

summing said second series of pulses accumulated up to the emission of one pulse from said first series of pulses to form a sum;

displaying said sum on a single readout so that miles traveled per unit of fuel consumed is visible; and replacing said sum with a subsequent sum on said readout with each subsequent pulse generated from said first series.

10. Method of Claim 9 including the step:

summing for a given interval said second series of pulses to form a second sum; and displaying said second sum on a readout so that total amount of fuel consumed for said interval is displayed.

11. The method of Claim 9 including the step of:

summing for a given interval all of said pulses of said first series to form a third sum; and displaying said third sum on a readout so that total miles traveled for said interval is displayed.

12. The method of Claim 11 including the steps:

summing for said given interval said second series of pulses to form a second sum; and displaying said second sum on a readout so that total amount of fuel consumed for said interval is displayed.

* * * * *